United States Patent
Tsuji

(10) Patent No.: US 7,058,529 B2
(45) Date of Patent: Jun. 6, 2006

(54) MICROWAVE SENSOR SYSTEM

(75) Inventor: Masatoshi Tsuji, Ohtsu (JP)

(73) Assignee: Optex Co., Ltd., Shiga (JP)

( * ) Notice: Subject to any disclaimer, the term of this patent is extended or adjusted under 35 U.S.C. 154(b) by 192 days.

(21) Appl. No.: 10/740,812

(22) Filed: Dec. 22, 2003

(65) Prior Publication Data
US 2004/0138839 A1 Jul. 15, 2004

(30) Foreign Application Priority Data
Jan. 10, 2003 (JP) .............................. 2003-004771

(51) Int. Cl.
*G06F 19/00* (2006.01)
(52) U.S. Cl. .......................................... 702/72; 702/66
(58) Field of Classification Search ................ 250/250, 250/336.1; 257/482, 604; 324/76.11, 76.14, 324/76.26, 76.56, 250, 629, 630, 631, 633, 324/634, 635, 637, 638, 639, 640, 642, 643, 324/644; 340/545.3; 455/FOR. 226, FOR. 230; 702/50, 57, 66, 70, 71, 72, 75, 104, 106, 702/116, 127, 182, 183, 189
See application file for complete search history.

(56) References Cited
U.S. PATENT DOCUMENTS
4,697,184 A * 9/1987 Cheal et al. .................. 342/28
6,380,882 B1 * 4/2002 Hegnauer .................... 342/28
6,650,276 B1 * 11/2003 Lawless ....................... 342/28

FOREIGN PATENT DOCUMENTS
JP 06-347564 * 12/1994

OTHER PUBLICATIONS
Vivekanandan, J.; Turk, J.; "High resolution microwave radiometric signatures of mid-latitude and tropical rainfall"; Intnl Surface and Atmospheric Geoscience and Remote Sensing Symposium; vol. 1; Aug. 8-12, 1994; pp. 433-435.*
Blackwell, W.J.; Staelin, D.H.; "Cloud flagging and clearing using high-resolution infrared and microwave sounding data"; IEEE International Geoscience and Remote Sensing Symposium; vol. 3; Jun. 24-28, 2002; pp. 1860-1862.*

* cited by examiner

Primary Examiner—Michael Nghiem
Assistant Examiner—Douglas N. Washburn
(74) Attorney, Agent, or Firm—Wenderoth, Lind & Ponack, L.L.P.

(57) ABSTRACT

Detection error resulting from rain, in the case of clear weather, and in the case of rainy weather are included in measurements by a measurement unit disposed in an MW sensor system. The error resulting from rain sharply increases as a preset $\Delta f$ becomes larger. The error in the case of clear weather sharply decreases as the preset $\Delta f$ becomes larger. Using $\Delta f$ as a parameter, a range, in which the rate of variability of the detection error resulting from rain with respect to $\Delta f$ is low overlaps with a range where the rate of variability of the detection error in the case of clear weather is low is set as the range of the detection error in the case of rainy weather. The detection error in the case of rainy weather becomes lower than the value of the detection error in the case of clear weather.

6 Claims, 5 Drawing Sheets

MICROWAVE SENSOR SYSTEM

BACKGROUND OF THE INVENTION

The present invention relates to a microwave (hereinafter referred to as "MW") sensor system that is an active sensor using magnetic waves of a lower frequency than that of visible light rays.

At present, as one security device, an MW sensor system is known which, when MWs are transmitted toward a detection area and a target (e.g., rain, snow, human bodies) serving as the detection target is present in the detection area, receives waves (MWs modulated by the Doppler effect) reflected from the target to detect the target.

This MW sensor system is disposed with a transmitter and a receiver that transmit and receive MWs. When a target is present in the detection area, the MWs transmitted from the transmitter towards the detection area are received by the receiver after the frequencies of the waves reflected from the target are modulated by the Doppler effect. In other words, in this case, because the MWs received by the receiver are modulated with respect to the frequency of the MWs transmitted from the transmitter, a change arises in the output signal waveform of the MW sensor system, whereby the target detection signal is transmitted from the MW sensor system (e.g., see Japanese Patent Application Laid-Open Publication No. Hei6-347564).

Among MW sensor systems, there is a system provided with two sensors that transmit MWs toward a detection area and receive MWs reflected from this detection area.

In this MW sensor system provided with two sensors, the phases of the MWs transmitted from the sensors are respectively different (dual-frequency system). Due to this phase difference and a preset frequency difference (referred to below as "$\Delta f$"), a target in a preset detection area is detected. Because this system uses sensors in which the phases of the MWs are respectively different, it can more reliably measure the distance to the target in comparison to an MW sensor system disposed with one sensor.

However, if there is an object between the sensors and the target, the dual-frequency MW sensor system is affected by that object. For example, in a case where rain is present in the air between the sensors and the target as in a rainfall, that rain is detected and appears as noise in the IF (Intermediate Frequency) output signals.

That is, the distance from the sensors to the detected rain ends up being measured rather than the distance from the sensors to the target. For this reason, the rain is outputted as noise and the phase difference of the two IF output signals of the rain noise becomes small, which is a reason why rain noise lowers detection accuracy, as shown in FIG. 6.

FIG. 6 is a graph showing the relation between the phase difference (represented below as "$\Delta\phi$") of target detection signals, in a case where $\Delta f$ equals 5 MHz, and the distance from the sensors to the detection area. The single-dot line in FIG. 6 represents the phase difference in the case of clear weather (i.e., the phase difference that the system originally has in a state not affected by weather), the solid line represents the phase difference in the case of rainy weather, and the dotted lines represent a case where $\Delta\phi$ is $\pi$ and the distance from the sensors to the detection area (represented below as "R") is 15 m. Also, as conditions for the measurement, the maximum of R is set to 15 m, the target signal is set to 200 mV (represented below as "S") and the rain noise is set to 140 mV (represented below as "N"), so that S/N=3 dB.

As shown in FIG. 6, when R is 15 m, a detection error of 30% arises in the case of rainy weather compared to the case of clear weather. For this reason, it has not been possible to increase the distance from the sensors to the detection area.

Thus, in order to solve this problem, it is an object of the present invention to provide a microwave sensor system that reduces detection error during rainy weather and with which the distance from the sensors to the detection area is optionally set.

SUMMARY OF THE INVENTION

A microwave sensor system of the present invention to achieve the above object comprises a plurality of sensors each having a different phase that transmit microwaves toward a detection area and that receive microwaves reflected from the detection area; a determination unit that determines whether or not the microwaves have been received by the sensors; and a measurement unit that computes the respective phase differences of the microwaves received by the a plurality of sensors when the determination unit has verified reception of the microwaves and computes the distance from the sensors to a target serving as a detection target within the detection area. The measurement unit measures detection error on the basis of the computed phase difference, the computed distance and a preset frequency difference. The measurement by the measurement unit includes detection error resulting from the presence of moisture such as rainfall in the air between the sensors and the target, detection error that the system has, and detection error obtained by adding these detection errors together. The detection error resulting from moisture sharply increases as the preset frequency difference becomes larger and the detection error that the system has sharply decreases as the preset frequency difference becomes larger. Using the preset frequency difference as a parameter, a range in which a range where the rate of variability of the value of the detection error resulting from moisture with respect to the preset frequency difference is low overlaps with a range where the rate of variability of the value of the detection error that the system has is low is set as the range of the added detection error. The value of the added detection error becomes lower than the value of the detection error that the system has.

According to this invention, the system is configured so that, using the preset frequency difference as a parameter, the range in which the range where the rate of variability of the value of the detection error resulting from moisture with respect to the preset frequency difference is low overlaps with the range where the rate of variability of the value of the detection error that the system has is low is set as the range of the added detection error and so that the value of the added detection error becomes lower than the value of the detection error that the system has. Thus, it becomes possible to reduce the detection error stemming from weather that arises by increasing the distance from the sensors to the detection area. In particular, it becomes possible to reduce the detection error in the case of rainy weather.

In the above arrangement, the frequency difference may be set such that the value of the detection error that the system has becomes low in the case of clear weather and is within the range of the added detection error when moisture is present in the air such as in the case of rainy weather. Specifically, for example, a switching switch may be mechanically disposed so that the frequency difference is controlled by the switching switch. The frequency difference may also be controlled by electrically switching the frequency difference in association with rain detection resulting from a rain detector unit (optical, conductive, etc.).

In this case, it becomes possible to configure the invention to respectively suppress, to a minimum, detection errors in the case of clear weather and in the case of rainy weather. For this reason, it becomes possible to always lower the values of the detection errors without them stemming from the weather.

Specifically, in the above arrangement, when the frequency difference is 5 MHz, the range of the added detection error is preferably set between 2.5 MHz and 3.75 MHz. Furthermore, the value of the added detection error is 2.5 MHz preferably.

DESCRIPTION OF THE PREFERRED EMBODIMENT

An embodiment of the invention will be described below with reference to the drawings. It should be noted that, in the embodiment described below, a case will be described where the invention is applied to dual-frequency microwave sensors (referred to below as "sensors").

Figure 1:
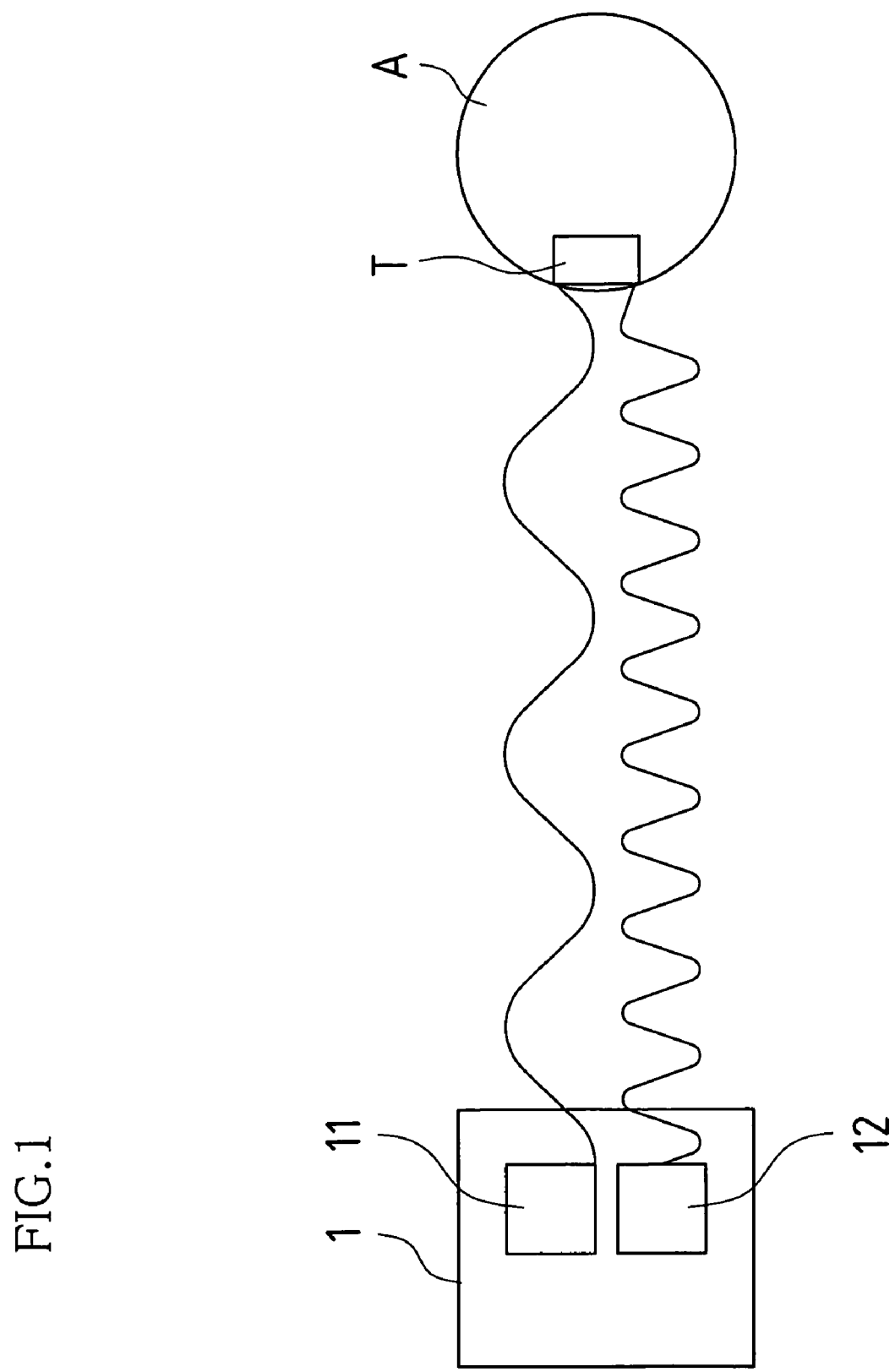
FIG. 1 is a schematic diagram of a microwave sensor system in accordance with an embodiment of the invention.

As shown in FIG. 1, a microwave sensor system 1 (abbreviated below as "the MW sensor system") comprises two sensors 11 and 12 that transmit microwaves (abbreviated below as "MWs") toward a detection area A and receive MWs reflected from the detection area. The phase of IF output signals of the MWs transmitted from the sensors 11 and 12 is respectively different.

Figure 2:
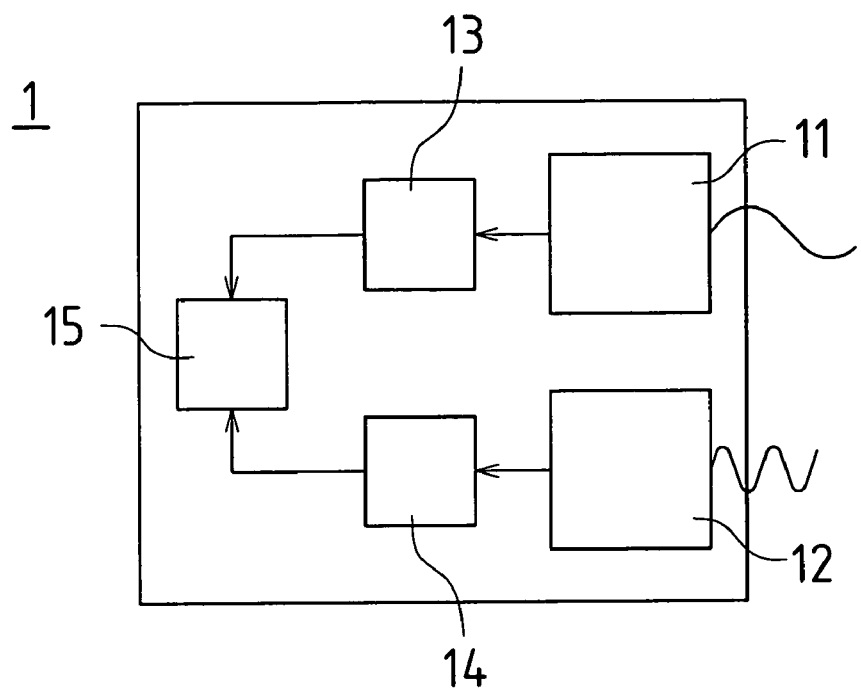
FIG. 2 is a schematic block diagram of the microwave sensor system in accordance with an embodiment of the invention.

As shown in FIG. 2, determination units 13 and 14, which determine whether or not the sensors 11 and 12 have received the MWs, are respectively connected to the sensors 11 and 12. A measurement unit 15, which measures the detection error in the MW sensor system 1 from the results of determination by the determination units 13 and 14, is connected to the determination units 13 and 14.

The measurement unit 15 computes the phase difference (represented below as "Δø") of the MWs respectively received by the sensors 11 and 12 when the determination units 13 and 14 have verified reception of the MWs, and computes the distance (represented below as "R") from the sensors 11 and 12 to a target T in the detection area A. The measurement unit 15 measures detection error on the basis of the computed phase difference, the computed distance and the frequency difference (represented below as "Δf") of the sensors 11 and 12 according to a preset RF signal. It should be noted that R measured by the measurement unit 15 is determined by the following equation.

$$R = \Delta\phi \cdot C/(4\pi \cdot \Delta f)$$ (Equation 1)

(C: light velocity)

Included in the measurement of the measurement unit 15 are detection error resulting from rain due to rainfall being present in the air between the sensors 11 and 12 and the target T (referred to below as detection error resulting from rain), detection error that the MW sensor system 1 has (this refers to detection error in a state where the system is not being affected by weather, such as in the case of clear weather, and is referred to below as detection error in the case of clear weather), and detection error obtained by adding these detection errors together (referred to below as detection error in the case of rainy weather described below).

The detection error resulting from rain sharply increases as the preset Δf becomes larger. It should be noted that, because the system is greatly affected when rain is falling near the sensors 11 and 12 in a case where the dual-frequency microwave system is used, the affect of rain noise is reduced by making Δø smaller.

The detection error in the case of clear weather refers to detection error that is not affected by the outside environment (e.g., in the case of clear weather), and sharply decreases as the preset Δf becomes larger. Detection error in the case of clear weather is determined by the following equation.

$$\beta = A/\Delta f$$ (Equation 2)

(β: detection error in the case of clear weather; A: a constant)

Figure 3:
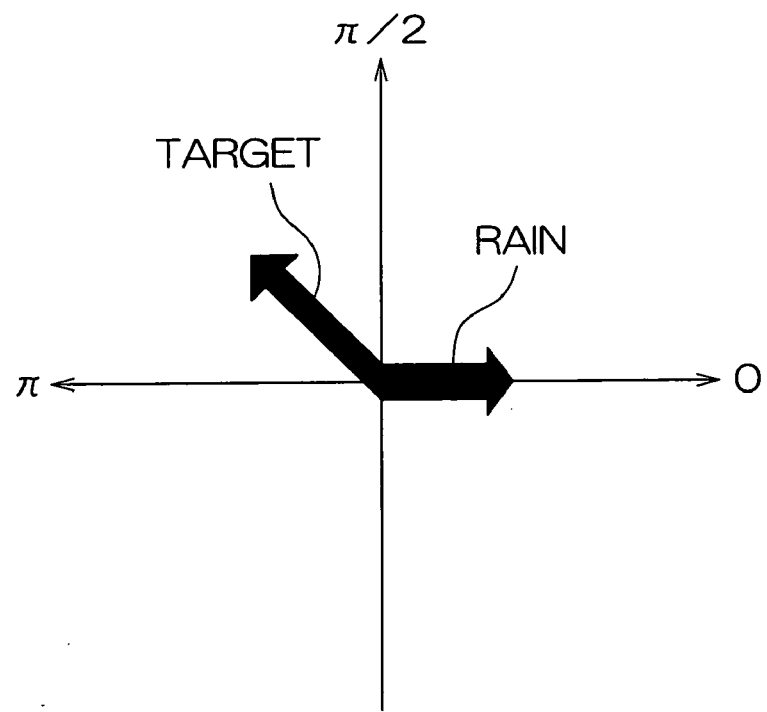
FIG. 3 is a diagram showing the vector relation of MWs that sensors disposed in the microwave sensor system in accordance with the embodiment of an invention emit during rainfall.

Detection error in the case of rainy weather is measured by adding together the detection error resulting from rain and the detection error in the case of clear weather. It should be noted that, as shown in FIG. 3, the detection output signal in the case of rainy weather is formed by vector-synthesizing the detection signal of the target T and the rain noise. For this reason, as shown in FIG. 3, the detection signal of the target T is greatly affected by rain noise as the phase of the detection signal of the target T and the phase of the rain noise move away from each other.

The MW sensor system 1 is configured so that, using the preset Δf as a parameter, the range in which a range 1a, where the rate of variability of the value of the detection error resulting from rain with respect to Δf is low (see FIG. 4), overlaps with a range 1b, where the rate of variability of the value of the detection error in the case of clear weather is low (see FIG. 4), is set as a range 1c (see FIG. 4) of the detection error in the case of rainy weather and so that the value of the detection error in the case of rainy weather becomes lower than the value of the detection error in the case of clear weather.

Moreover, a switching switch (not shown) that mechanically varies Δf is disposed in the MW sensor system 1. Due to the switching of the switching switch, Δf is set so that, in clear weather, the value of the detection error in the case of clear weather becomes low and so that, in rainy weather, it is within the range of the detection error in the case of rainy weather.

EXAMPLE

Figure 4:
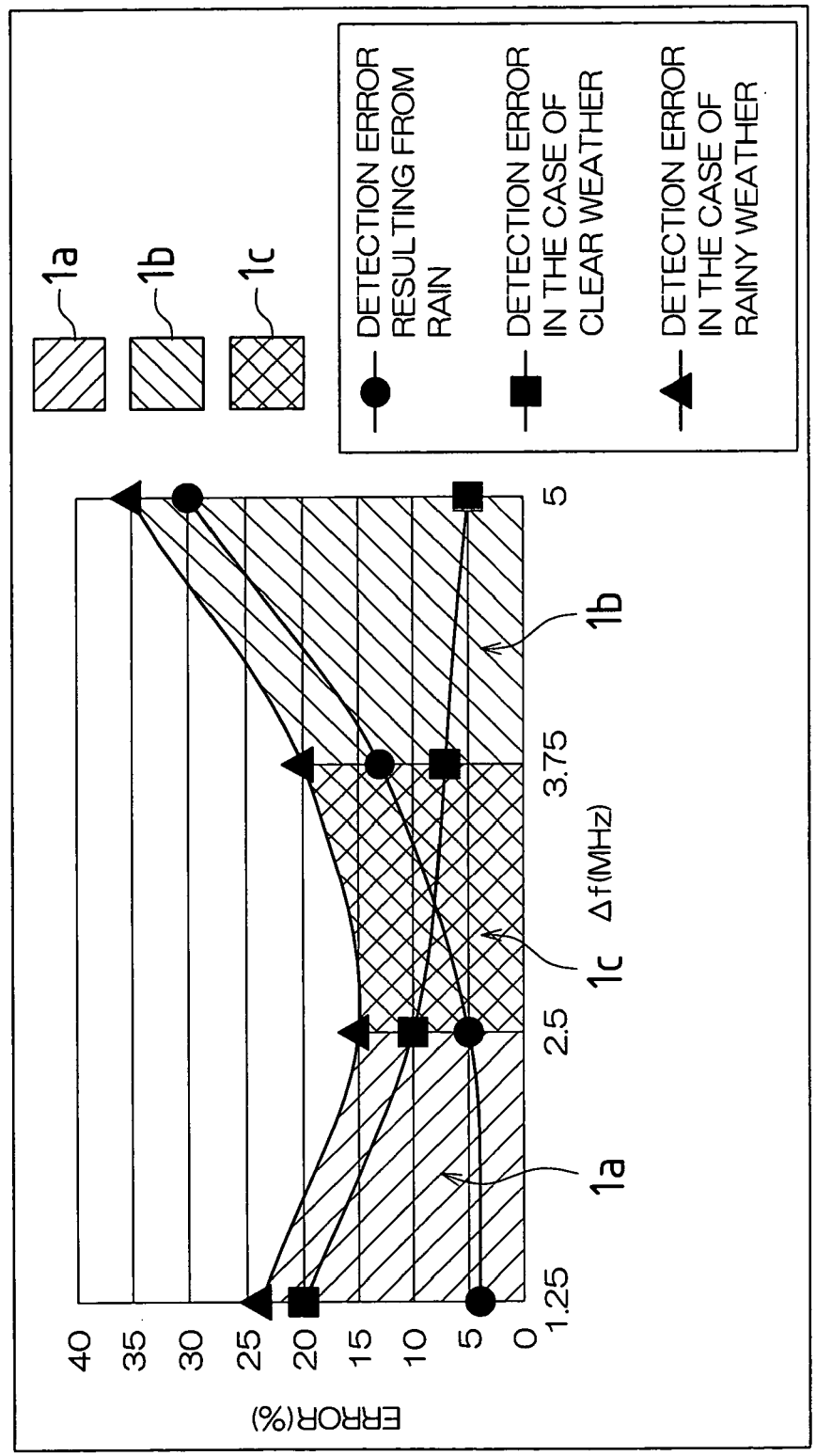
FIG. 4 is a graph where detection error in the case of rainy weather is measured using the microwave sensor system in accordance with an embodiment of the invention.

Next, the detection error in the case of rainy weather was measured using the MW sensor system 1. The measurement results are shown in Table 1, and the measurement results shown in Table 1 are shown in FIG. 4. It should be noted that, as measurement conditions, the maximum of R was set to 15 m, the target signal was set to 200 mV (represented below as "S") and the rain noise was set to 140 mV (represented below as "N") so that S/N=3 dB.

TABLE 1

| $\Delta f$ (MHz) | Detection Error Resulting from Rain | Detection Error in the Case of Clear Weather | Detection Error in the Case of Rainy Weather |
|---|---|---|---|
| 1.25 | 4 | 20 | 24 |
| 2.5 | 5 | 10 | 15 |
| 3.75 | 13 | 7 | 20 |
| 5 | 30 | 5 | 35 |

As shown in FIG. 4, the MW sensor system 1 used the preset $\Delta f$ as a parameter and the range in which the range 1a, where the rate of variability of the value of the detection error resulting from rain with respect to $\Delta f$ is low, overlaps with the range 1b, where the rate of variability of the value of the detection error in the case of clear weather is low, was set as the range 1c of the detection error in the case of rainy weather.

It will be understood from Table 1 and FIG. 4 that, in the present example, optimum conditions were achieved when $\Delta f$ was set to 5 MHz in the case of clear weather and when $\Delta f$ was set to 2.5 MHz in the case of rainy weather.

Figure 5:
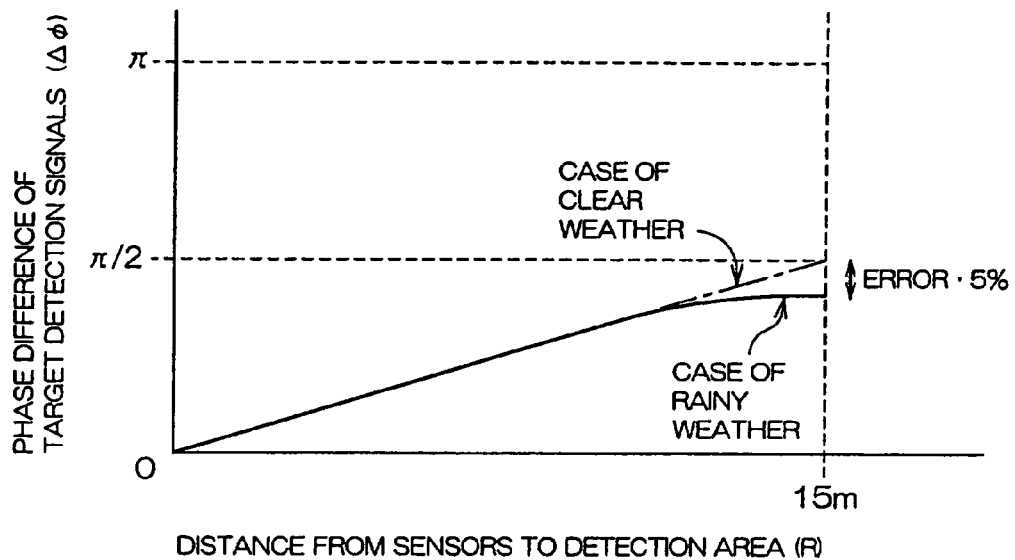
FIG. 5 is a graph showing the relation between the phase difference of target detection signals, when the frequency difference is set to 2.5 MHz, and the distance from the sensors to a detection area.
Figure 6:
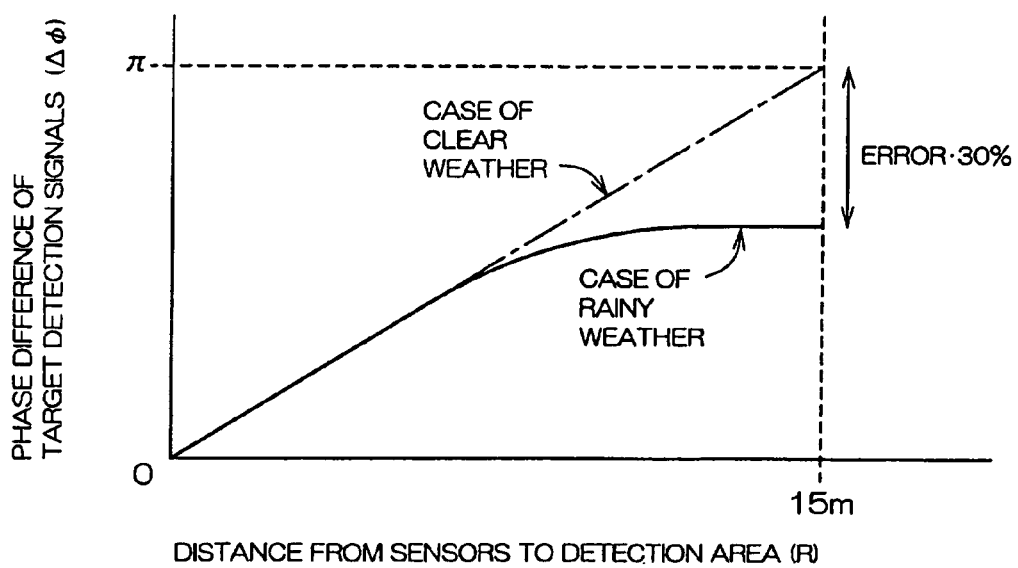
FIG. 6 is a graph showing the relation between the phase difference of target detection signals, when the frequency difference is set to 5 MHz, and the distance from the sensors to the detection area.

The relations between R and $\Delta \phi$ of the target detection signal in the case where $\Delta f$ was set to 5 MHz and the case where $\Delta f$ was set to 2.5 MHz are shown in FIGS. 5 and 6.

The single-dot line in FIG. 5 represents the phase difference in the case of clear weather, the solid line represents the phase difference in the case of rainy weather, and the dotted lines represent the cases where $\Delta \phi$ was n/2 and n and R was 15 m.

The single-dot line in FIG. 6 represents the phase difference in the case of clear weather, the solid line represents the phase difference in the case of rainy weather, and the dotted lines represent the cases where $\Delta \phi$ was n and R was 15 m.

Also, although the original $\Delta f$ of the measurement conditions was set in the present example, the invention is not limited thereto and may also be configured so that the values of the detection error in the case of clear weather and the detection error in the case of rainy weather vary in accompaniment with variations in the measurement conditions.

According to the above-described MW sensor system 1, the invention is configured so that, using the preset $\Delta f$ as a parameter, the range in which the range 1a, where the rate of variability of the value of the detection error resulting from rain with respect to $\Delta f$ is low, overlaps with the range 1b, where the rate of variability of the value of the detection error in the case of clear weather is low, is set as the range 1c of the detection error in the case of rainy weather and so that the value of the detection error in the case of rainy weather becomes lower than the value of the detection error in the case of clear weather. Thus, the detection error in the case of rainy weather that arises by increasing the distance from the sensors 11 and 12 to the detection area A can be reduced.

For this reason, even if rain is falling, the detection error can be reduced and the distance from the sensors 11 and 12 to the detection area A can be optionally set.

Also, the switching switch that mechanically varies $\Delta f$ is disposed in the MW sensor system 1 and, due to the switching of the switching switch, $\Delta f$ is set so that the value of the detection error in the case of clear weather becomes low in the case of clear weather and so that it is within the range of the detection error in the case of rainy weather. Thus, the invention can be configured to respectively suppress, to a minimum, detection errors in the case of clear weather and in the case of rainy weather, and the values of the detection errors can always be lowered without them stemming from the weather.

It should be noted that, although dual-frequency microwave sensors were used for the sensors 11 and 12 in the present embodiment, the sensors are not limited to those described in the embodiment and may also be sensors of a system having dual or more frequencies.

Also, although the detection error in the case of rainy weather was reduced in the present embodiment, the invention is not limited thereto. To the extent that moisture is present in the air, detection error in the case of, for example, snowy weather may also be reduced.

Figure 7:
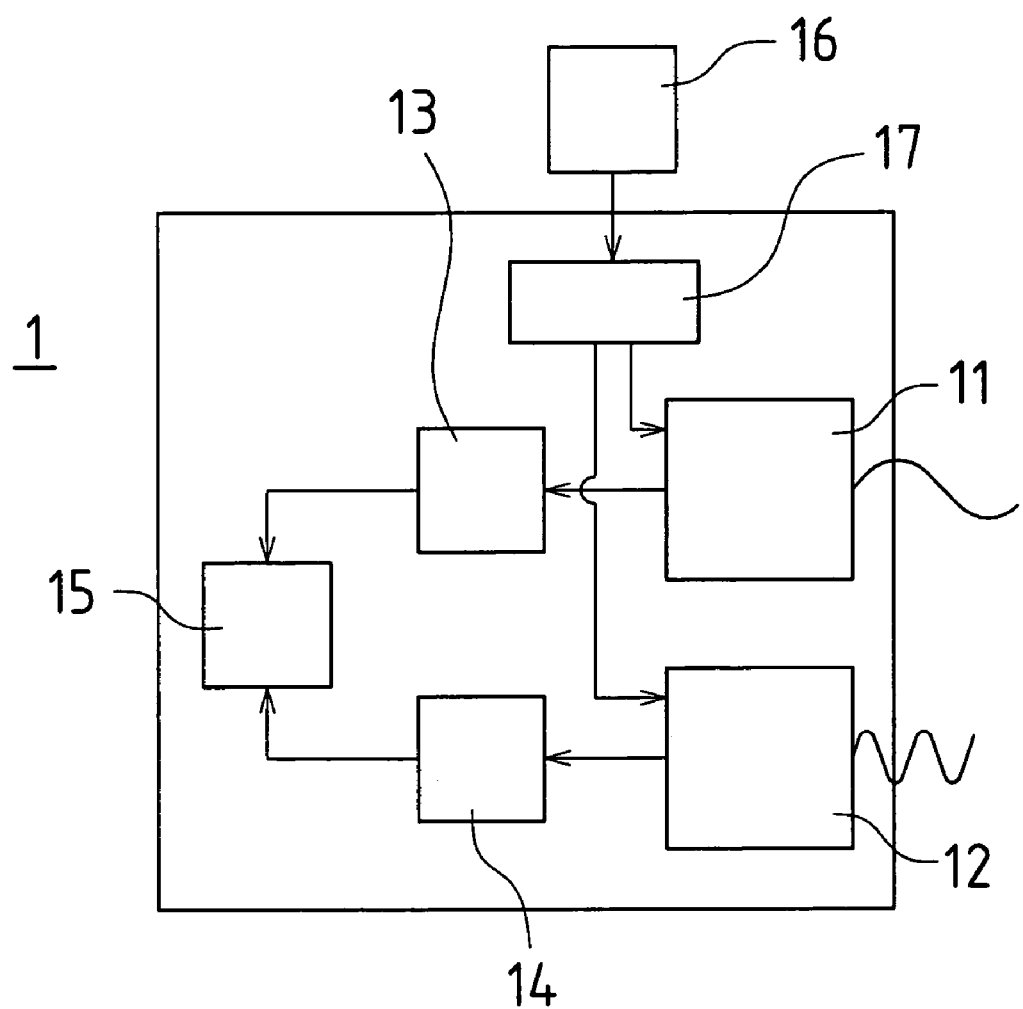
FIG. 7 is a schematic block diagram of a microwave sensor system of another mode in accordance with the invention.

Also, although a switching switch was mechanically disposed in the present embodiment, the invention is not limited thereto. As shown in FIG. 7, the frequency difference may also be controlled from a controller unit 17 so that $\Delta f$ is electrically varied in association with rain detection resulting from an optical or conductive rain detector unit 16.

In this case, because $\Delta f$ is electrically varied, the invention can be configured to respectively suppress, to a minimum, detection errors in the case of clear weather and in the case of rainy weather. For this reason, the values of the detection errors can always be lowered without them stemming from the weather. Also, $\Delta f$ corresponding to the case of clear weather and to the case of rainy weather can be automatically set by the rain detector unit 16.

As described above, according to the microwave sensor system in accordance with the invention, detection errors can be reduced without them stemming from the weather (e.g., case of rainy weather) and the distance from the sensors to the detection area can be optionally set. For this reason, the invention is useful for an outdoor-use microwave sensor system.

That is, according to the microwave sensor system in accordance with the invention, the invention is configured so that, using the preset frequency difference as a parameter, the range in which the range where the rate of variability of the value of the detection error resulting from moisture with respect to this preset frequency difference is low overlaps with the range where the rate of variability of the value of the detection error that the system has is set as the range of an added detection error so that the value of the added detection error becomes lower than the value of the detection error that the system has. Thus, detection error stemming from weather that arises by increasing the distance from the sensors to the detection area can be reduced. In particular, detection error in the case of rainy weather can be reduced. As a result, the detection errors can be reduced without them stemming from the weather and the distance from the sensors to the detection area can be optionally set.

This application is an application based on Japanese Patent Application No. 2003-4771 filed in Japan, of which contents are herein incorporated by reference. The documents cited in this specification are in their entirety specifically incorporated by reference.

The invention claimed is:

1. A microwave sensor system comprising:

a plurality of sensors each having a different phase that transmit microwaves toward a detection area and that receive microwaves reflected from the detection area;

a determination unit that determines whether or not the microwaves have been received by the sensors; and a measurement unit that computes the respective phase differences of the microwaves received by the a plurality of sensors when the determination unit has verified reception of the microwaves and computes the distance from the sensors to a target serving as a detection target within the detection area, the measurement unit measuring detection error on the basis of the computed phase difference, the computed distance and a preset frequency difference, wherein the measurement by the measurement unit includes detection error resulting from the presence of moisture such as rainfall in the air between the sensors and the target, detection error that the system has, and detection error obtained by adding these detection errors together, wherein the detection error resulting from moisture sharply increases as the preset frequency difference becomes larger and the detection error that the system has sharply decreases as the preset frequency difference becomes larger, wherein using the preset frequency difference as a parameter, a range in which a range where the rate of variability of the value of the detection error resulting from moisture with respect to the preset frequency difference is low overlaps with a range where the rate of variability of the value of the detection error that the system has is low is set as the range of the added detection error, and wherein the value of the added detection error becomes lower than the value of the detection error that the system has.

2. The microwave sensor system of claim 1, wherein the frequency difference is set such that the value of the detection error that the system has becomes low in the case of clear weather and is within the range of the added detection error when moisture is present in the air such as in the case of rainy weather.

3. The microwave sensor system of claim 1, wherein when the frequency difference is 5 MHz, the range of the added detection error is set between 2.5 MHz and 3.75 MHz.

4. The microwave sensor system of claim 3, wherein the value of the added detection error is 2.5 MHz.

5. The microwave sensor system of claim 2, wherein when the frequency difference is 5 MHz, the range of the added detection error is set between 2.5 MHz and 3.75 MHz.

6. The microwave sensor system of claim 5, wherein the value of the added detection error is 2.5 MHz.

* * * * *